(12) United States Patent
Kis (10) Patent No.: US 12,422,197 B2
(45) Date of Patent: Sep. 23, 2025

(54) METHOD OF MAKING A HEAT EXCHANGER

(71) Applicant: Modine Manufacturing Company, Racine, WI (US)

(72) Inventor: Michael J. Kis, Sturtevant, WI (US)

(73) Assignee: Modine Manufacturing Company, Racine, WI (US)

( * ) Notice: Subject to any disclaimer, the term of this patent is extended or adjusted under 35 U.S.C. 154(b) by 532 days.

(21) Appl. No.: 17/963,721

(22) Filed: Oct. 11, 2022

(65) Prior Publication Data
US 2024/0118039 A1    Apr. 11, 2024

(51) Int. Cl.
| | |
|---|---|
| *F28F 1/10* | (2006.01) |
| *B23K 35/02* | (2006.01) |
| *B23K 101/14* | (2006.01) |
| *F28F 19/06* | (2006.01) |

(52) U.S. Cl.
CPC .......... *F28F 1/105* (2013.01); *B23K 35/0205* (2013.01); *F28F 19/06* (2013.01); *B23K 2101/14* (2018.08)

(58) Field of Classification Search
CPC ........ Y10T 29/49373; Y10T 29/49375; B23K 2101/14; B23K 1/008
See application file for complete search history.

(56) References Cited

U.S. PATENT DOCUMENTS

| | | |
|---|---|---|
| 1,320,652 A | 11/1919 | Sonneborn |
| 2,164,628 A | 7/1939 | Sibley |
| 2,488,627 A | 11/1949 | Hisey |
| 2,710,443 A * | 6/1955 | Webb .................. B23K 9/0288 |
| | | 285/125.1 |
| 3,181,440 A | 5/1965 | Mullaney et al. |
| 3,245,465 A | 4/1966 | Young |
| 4,234,041 A | 11/1980 | Melnyk |

(Continued)

FOREIGN PATENT DOCUMENTS

| | | |
|---|---|---|
| CN | 112160827 A | 1/2021 |
| JP | 2008089257 A | 10/2006 |

OTHER PUBLICATIONS

International Search Report and Written Opinion for Application No. PCT/US2023/034748 dated Feb. 8, 2024 (14 pages).

(Continued)

*Primary Examiner* — Jason L Vaughan
(74) *Attorney, Agent, or Firm* — Michael Best & Friedrich LLP (57) ABSTRACT

A method of making a heat exchanger that includes providing a plurality of tubes. Each of the plurality of tubes has exterior cladding on an exterior surface, interior cladding on an interior surface, and a weld seam extending along the length of the plurality of tubes. The method further includes arranging the plurality of tubes such that each of the plurality of tubes is inserted into a corresponding header slot with the weld seams of each of the plurality of tubes oriented downward with respect to gravity, and brazing each of the plurality of tubes and the header after each tube has been inserted into a corresponding header slot. The brazing causes the interior cladding to melt and pool inside the plurality of tubes and along an interior side of the weld seams to form a clad cover portion encases debris generated while forming the weld seams.

20 Claims, 9 Drawing Sheets

(56) References Cited

U.S. PATENT DOCUMENTS

| | | | |
|---|---|---|---|
| 4,377,024 A | 3/1983 | Saperstein | |
| 4,529,034 A | 7/1985 | Saperstein | |
| 4,615,952 A * | 10/1986 | Knoll | F28F 19/06 228/208 |
| 4,730,669 A | 3/1988 | Beasley et al. | |
| 4,744,505 A | 5/1988 | Calleson | |
| 4,813,112 A | 3/1989 | Pilliez | |
| 4,858,686 A | 8/1989 | Calleson | |
| 4,891,275 A * | 1/1990 | Knoll | B21C 29/006 228/208 |
| 5,036,913 A | 8/1991 | Murphy et al. | |
| 5,046,555 A * | 9/1991 | Nguyen | F28F 9/182 228/183 |
| 5,105,540 A * | 4/1992 | Rhodes | F28F 1/40 228/183 |
| 5,150,520 A | 9/1992 | Derisi | |
| 5,172,476 A | 12/1992 | Joshi | |
| 5,178,211 A | 1/1993 | Bauer et al. | |
| 5,366,006 A | 11/1994 | Lu et al. | |
| RE35,098 E * | 11/1995 | Saperstein | B23K 9/0288 228/183 |
| 5,474,227 A | 12/1995 | Krengel et al. | |
| 5,732,874 A | 3/1998 | Krengel et al. | |
| 6,189,492 B1 | 2/2001 | Brown | |
| 7,150,335 B2 | 12/2006 | Sasano et al. | |
| 8,181,694 B2 | 5/2012 | Powers et al. | |
| 9,630,281 B2 | 4/2017 | Connor | |
| 11,420,298 B2 | 8/2022 | Kis | |
| 2002/0108244 A1 | 8/2002 | Appert et al. | |
| 2004/0164125 A1 * | 8/2004 | Morley | B23K 1/0008 228/223 |
| 2007/0138237 A1 | 6/2007 | Nishikawa et al. | |
| 2007/0160868 A1 * | 7/2007 | Watanabe | F28F 21/089 428/654 |
| 2008/0053646 A1 | 3/2008 | Martin | |
| 2022/0063029 A1 | 3/2022 | Kis | |

OTHER PUBLICATIONS

International Preliminary Report on Patentability for Application No. PCT/US2023/034748 dated Apr. 24, 2025 (8 pages).

\* cited by examiner

METHOD OF MAKING A HEAT EXCHANGER

FIELD OF THE INVENTION

The present invention relates to heat exchangers and to a method of making heat exchangers.

BACKGROUND OF THE INVENTION

Heat exchangers include components like tubes, headers, and fins that are joined together in a welding process. For example, flat sheet stock is commonly rolled or formed into a cylindrical shape and welded to form a tube. The welding process can be messy and it may be undesirable to have a significant amount of weld flash and debris remaining in areas of the heat exchanger. Often, the heat exchanger assembly is cleaned at or near the end of the production process of the heat exchanger to at least partially remove the weld flash and debris.

SUMMARY OF THE INVENTION

The present invention provides, in one aspect, a method of making a heat exchanger. The method includes providing a plurality of tubes. Each of the plurality of tubes has exterior cladding on an exterior surface of the plurality of tubes, interior cladding on an interior surface of the plurality of tubes, and a weld seam extending along the length of the plurality of tubes. The method further includes arranging the plurality of tubes into slots of a header such that each of the plurality of tubes is inserted into a corresponding header slot, and brazing each of the plurality of tubes and the header after each tube has been inserted into a corresponding header slot. The plurality of tubes is arranged into the header slots with the weld seams of each of the plurality of tubes oriented downward with respect to gravity. The brazing causes the interior cladding to melt and pool inside the plurality of tubes and along an interior side of the weld seams to form a clad cover portion within each of the plurality of tubes, the clad cover portion encasing debris generated while forming the weld seams.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
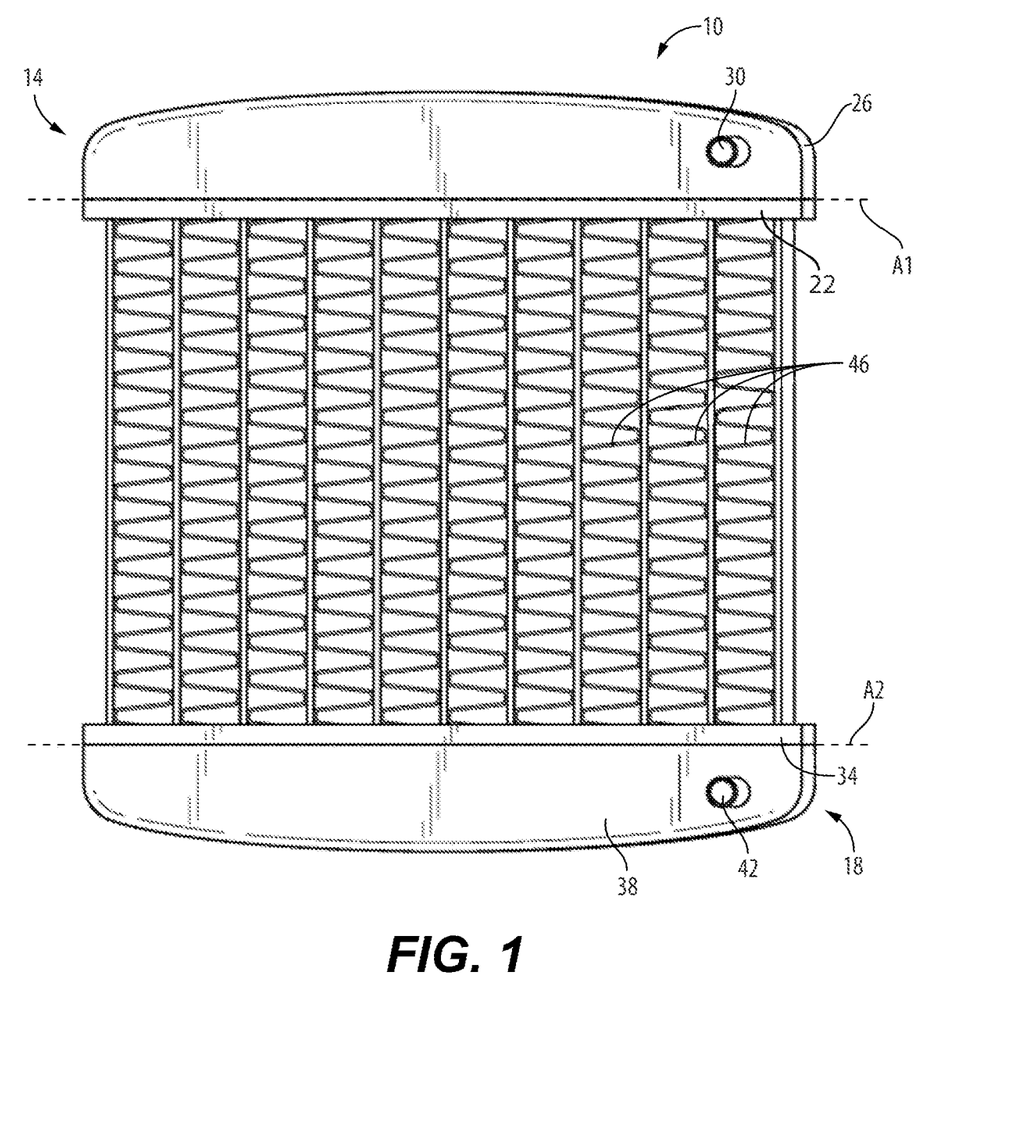
FIG. 1 is a front view of a heat exchanger.
Figure 3:
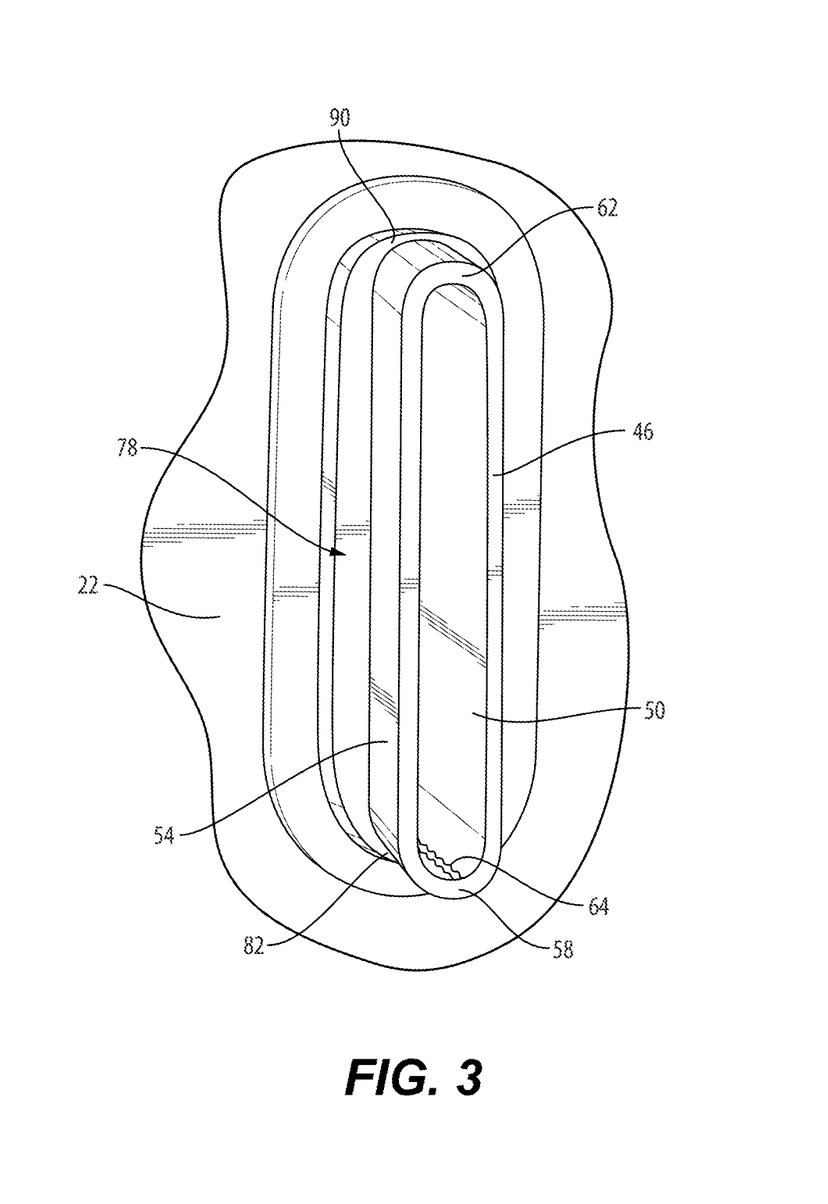
FIG. 3 is a partial perspective view of a tube for the heat exchanger of FIG. 1.
Figure 6:
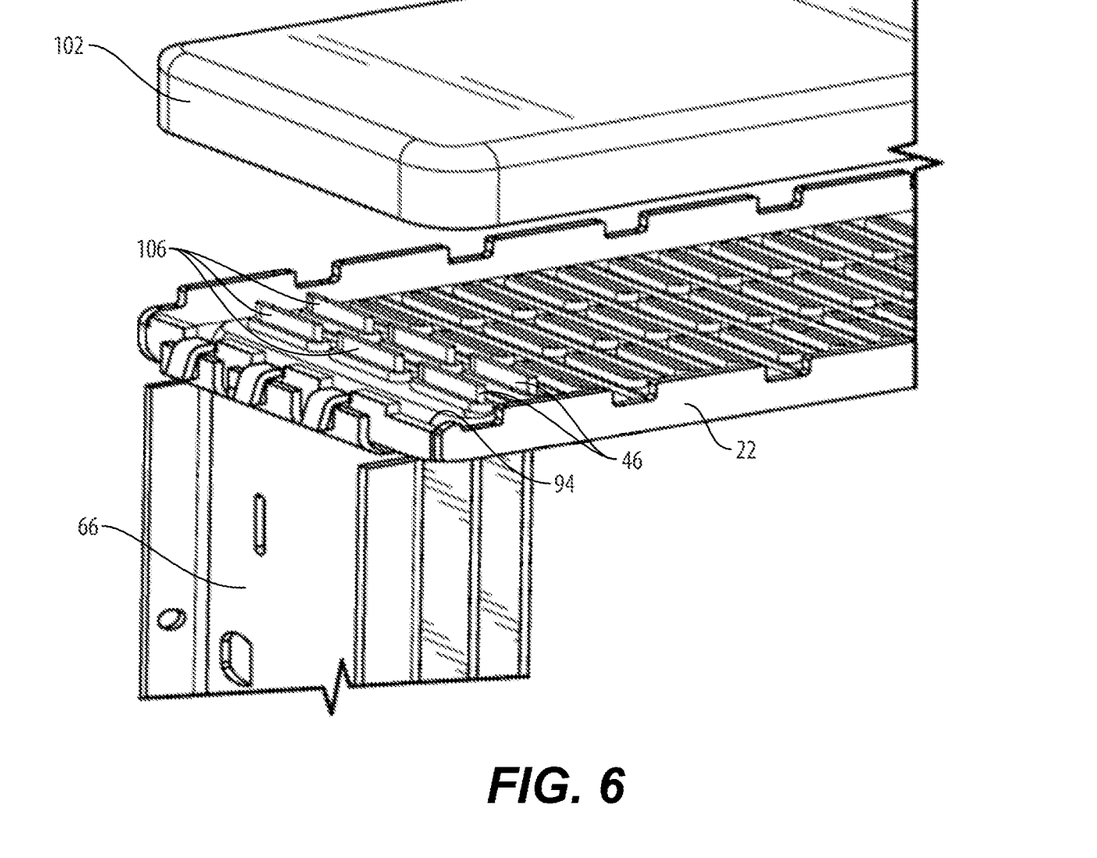
FIG. 6 is a top-down assembly view of the heat exchanger of FIG. 1.

FIG. 1 illustrates a heat exchanger 10 including a first collection tank assembly 14 and a second collection tank assembly 18. The first collection tank assembly 14 includes a header 22 and a collection tank 26 with an inlet 30. The second collection tank assembly 18 includes a header 34 and a collection tank 38 with an outlet 42. Each of the headers 22, 34 includes a face that defines a header plane A1, A2. In some embodiments, each of the headers 22, 34 are aluminum with braze cladding on one or two sides thereof. In some embodiments, the collection tanks 26, 38 are formed of plastic, and in such embodiments, gaskets are respectively arranged between the collection tanks 26, 38 and their respective headers 22, 34. In some embodiments, the collection tanks 26, 38 are made from aluminum and brazed to the headers 22, 34. A plurality of tubes 46 fluidly couple the first and second collection tank assemblies 14, 18 and are coupled to the headers 22, 34 of the first and second collection tank assemblies 14, 18. In some embodiments, the tubes 46 are formed of aluminum with braze cladding on one or two sides. In the illustrated in FIG. 3, which illustrates an exemplary tube 46 of the plurality of tubes 46, the tubes 46 have interior cladding on an interior surface 50 of the tubes 46 and exterior cladding on an exterior surface 54 of the tubes 46. Each of the tubes 46 has a first rounded edge 58 and a second rounded edge 62. Each tube 46 extends linearly between the rounded edges 58, 62. At the first rounded edge 58, each tube 46 has a weld seam 64 that extends along a length of the tube 46. Side plates 66, as shown in FIG. 6, are located at ends of the heat exchanger 10. The side plates 66 are formed from aluminum with cladding on one or both sides of the side plates 66.

Figure 2:
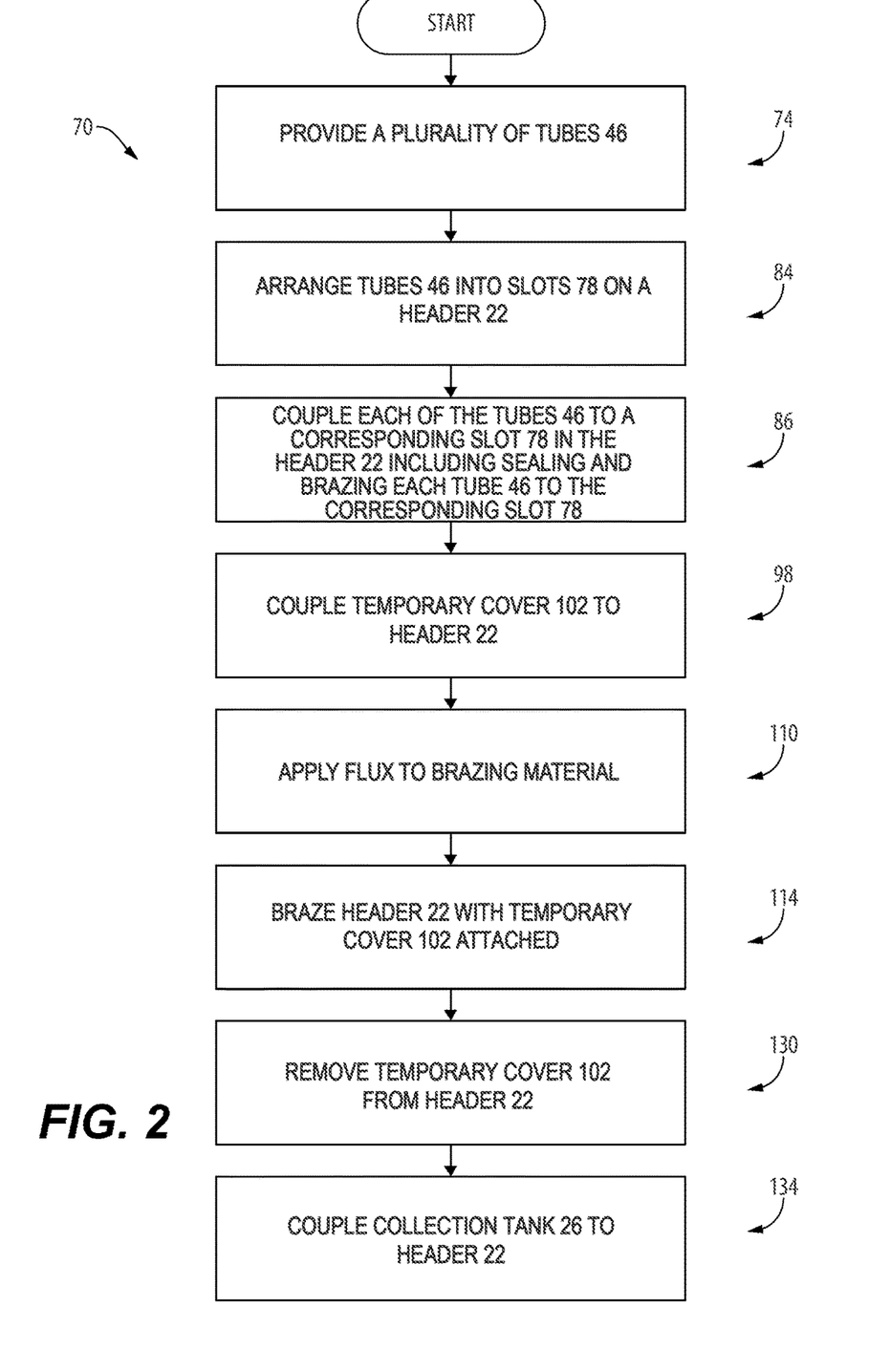
FIG. 2 is a flowchart illustrating an assembly process of the heat exchanger of FIG. 1.

FIG. 2 illustrates a method 70 of making the heat exchanger 10, or at least the first collection tank assembly 14 and/or the second collection tank assembly 18 of the heat exchanger 10. For simplicity of description, the following explanation will just cover the making of the first collection tank assembly 14. First, as shown at step 74, the heat exchanger 10 is provided with a plurality of tubes 46. Each of the tubes includes exterior cladding on the exterior surface 54, interior cladding on the interior surface 50, and a weld seam 64 extending along the length of the tube 46.

Figure 4:
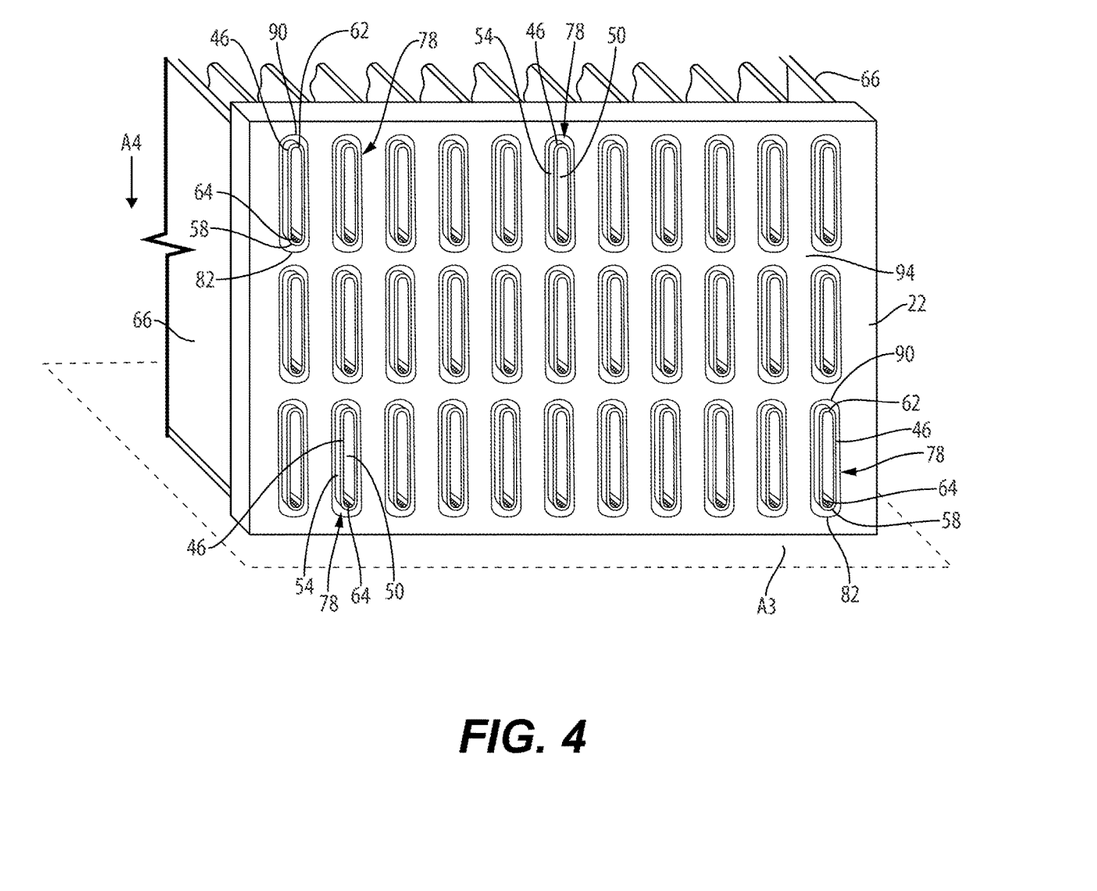
FIG. 4 is a perspective view of tubes arranged on a header of the heat exchanger.

At step 84, each of the tubes 46 is arranged in an array, stack, or formation on the header 22. In the illustrated embodiment, every tube 46, or all tubes 46, for the heat exchanger 10 is arranged in the formation. During step 84, as illustrated in FIG. 4, the tubes 46 are inserted through slots 78 formed in the face of the header 22 such that the tubes 46 extend through the plane A1 of the header 22. In the formation of the tubes 46, the first rounded edge 58 of each of the tubes 46 is aligned with a first end 82 of a corresponding slot 78 in the header 22. During step 84, the side plate 66 is on a first side of the stack and an opposite side plate 66 is on a second side of the stack.

With continued reference to FIG. 4, the tubes 46 and the header 22 are oriented such that the first rounded edge 58 of each tube 46 is positioned closer to a ground surface A3 along a direction of gravity A4 than the rest of the tube 46. The direction of gravity A4 is defined as a downward direction. In other words, the first rounded edge 58 of each tube 46 is positioned between the ground surface A3 and the second rounded edge 62 of the tube 46. When the formation of tubes 46 and the header 22 are oriented with the first rounded edge 58 of each tube 46 positioned closer to the ground surface A3 than the rest of the tube 46, the header plane A1 of FIG. 1 extends perpendicular to the ground surface A3 so that the weld seam 64 is oriented downward relative to the rest of the tube 46. Stated another way, the header plane A1 extends parallel to the direction of gravity A4.

Figure 5:
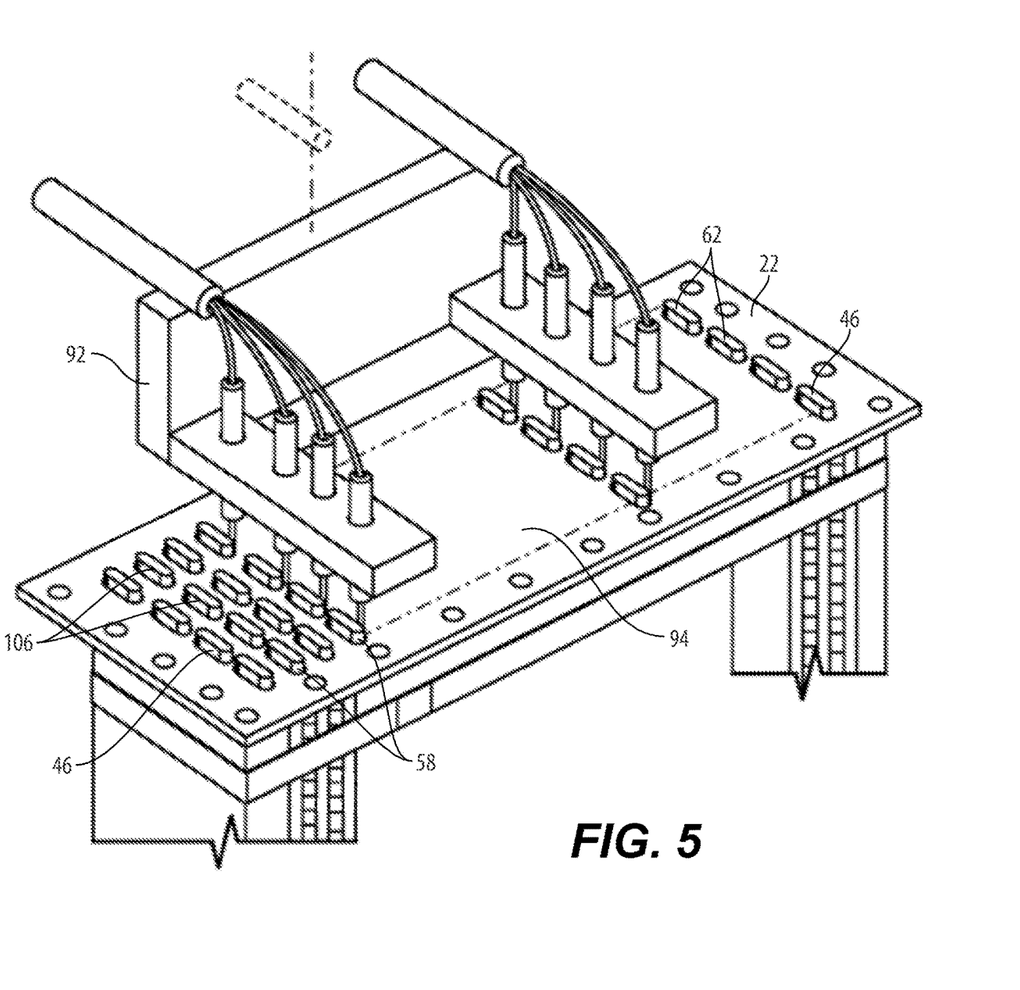
FIG. 5 is a perspective view of tubes being welded to a header of the heat exchanger of FIG. 1.

At step 86 and as shown in FIGS. 4 and 5, each of the tubes 46 is coupled to the corresponding slot 78 in the header 22. Coupling the tubes 46 to the header slots 78 includes sealing and brazing each tube 46 to the corresponding header slot 78. Each of the first rounded edges 58 of the tubes 46 is sealed to the corresponding first end 82 of the header slot 78, and each of the second rounded edges 62 of the tubes 46 is sealed to a corresponding second end 90 of the header slot 78. In the illustrated embodiment, the first rounded edge 58 of every tube 46, or all tubes 46, for the heat exchanger 10 is sealed to a corresponding first end 82 of a header slot 78. The rounded edges 58, 62 of the tubes 46 are welded to the header 22 on a liquid-side surface 94, thereby blocking flux from penetrating the header 22 to contact the liquid-side surface 94 or the rounded edges 58, 62 of the tubes 46. The liquid-side surface of the header 22 is a side of the header that contacts liquid when the assembled header 22 is in use.

FIG. 5 illustrates an example process of welding the tubes 46 to the header 22, using a multi-torch welder 92. No braze filler or back solder is applied between the tubes 46 and the respective headers 22, 34, as the engaged surfaces are clad with braze material that ultimately melts to join the tubes 46 to the respective headers 22, 34. That is, the clad on the exterior surface 54 of the tubes 46 melts to join the tubes 46 to the respective headers 22, 34. The slots 78 have collars that extend to the inside of the header 22. These collars have a thinner wall than the nominal thickness of the header 22. In some embodiments, the collars are thinner in thickness than the nominal thickness of the material forming the header 22. Ideally, the thickness of the collar material equals the thickness of the tube material.

With reference to FIGS. 4 and 5, during step 86, the production line includes a welder on one side of the production line, which could be a torch welder as shown in FIG. 4, or could be other types of conventional welders. The production line could include welders on both sides of the production line. As the header 22 and tubes 46 stop at the welder location, the welder welds the tubes 46 to the header 22. For a production line with a welder on just one side, the header 22 must be rotated to weld the tubes 46 to the header 22 on the opposite side. For a production line with welders on both sides, the tubes 46 can be welded to the headers 22, 34 on both sides of the header 22 at the same time. The geometry of the slot 78 in the header 22 helps to create the weld between the tube 46 and the header 22. The insertion distance of the tubes 46 into the header 22 is such that the tubes 46 extend through the header 22 and beyond the edges of the collars. The welding process melts both the ends of the tubes 46 and part of the collars to create a weld bead completely around the header slot 78, sealing the tubes 46 to the header slots 78.

In some embodiments, the welder includes a torch head, which can move along in predetermined pattern, and the torch head includes a plurality of torches. The pattern is programmed such that at least one torch moves around the perimeter of each tube 46 or collar during welding of the tube 46 to the collar. The torch may also follow a pattern that crosses a nose area (the narrow end of the tube) of the tube 46 at least one time in each nose area of the tube 46 and, ideally, multiple times. The weld pattern at the nose areas may look like an "X". The purpose of the weld at step 86 is to completely seal the tube 46 to the header 22 around header slot 78. The weld bead will be located in a range between flush with the inside of the header 22 and 2-3 mm from the inside wall of the header 22.

In some embodiments, the method 70 includes step 98. At step 98, with reference to FIGS. 6 and 7, a temporary cover 102 is coupled over the header 22, thereby covering the liquid-side surface 94 and a portion 106 of the tubes 46 that extends through the header 22 on the liquid-side surface 94 side of the header 22. During step 98, the temporary cover 102 extends completely over the header 22, around the perimeter of the header 22, and overlaps the side walls of the header 22 on the outside of the side walls. In some embodiments, the temporary cover 102 fits inside of the header 22, completely covering the inside of the header 22 and the portion 106 of the tubes 46 and overlaps the side walls of the header 22 on the inside of the side walls. In another embodiment, instead of the temporary cover 102, the collection tank 26 is brazed to the header 22 during the brazing operation. The temporary cover 102 can be made from plastic or metal. The temporary cover 102 can be fastened to the header 22 by an interference fit, snap-on fit, clamps, straps, or a mechanical fixture having a geometry that engages with both the header 22 and the temporary cover 102.

Figure 7:
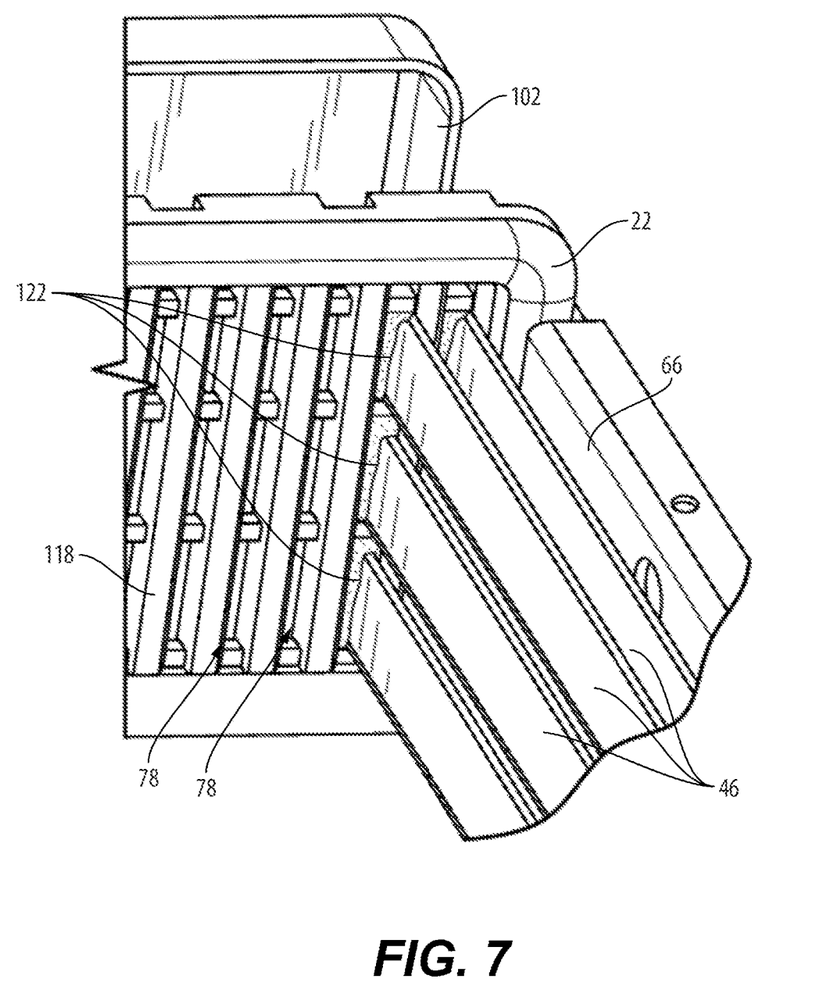
FIG. 7 is a bottom-up assembly view of the heat exchanger of FIG. 1.

At step 110, flux is applied to the tubes 46, side plates 66, and the surfaces of the header 22 that face the tubes 46. The flux removes oxidation on these surfaces during a subsequent brazing process, thus preventing corrosion and promoting free flow of the brazing material from the braze cladding. Because the temporary cover 102 covers the liquid-side surface 94 and the portion 106 of the tubes 46 that are welded to the header 22 prior to the application of flux at step 110, contamination of the tube 46, which can sometimes occur during application of flux, is inhibited. Thus, subsequent contamination of the liquid, such as fuel cell coolant, when passing through the tubes 46, is inhibited. In some embodiments, the temporary cover 102 is removed from the header 22 after fluxing and before brazing, particularly when the temporary cover 102 is formed from a plastic material.

At step 114, the header 22 goes through a brazing process while the temporary cover 102 remains on the header 22. During step 114, as illustrated in FIG. 7, the brazing material of the braze cladding melts to join the tubes 46 to the header 22 at an air-side surface 118 (i.e., a surface that, in normal use of the header 22 and tubes 46, is not contacted by liquid passing through the header and/or tubes 46), thereby forming a braze fillet 122 at the air-side surface 118, which further strengthens the joints between the tubes 46 and the header 22. In some embodiments, the heat exchanger 10 is moved into the brazing furnace for a Controlled Atmosphere Brazing (CAB) process. In the brazing process, the clad materials melt from the heat of the furnace, and the base materials of the components do not melt. The exterior cladding on the exterior surface 54 of each tube 46 flows to joint areas between components. The joint areas are where the tubes 46 meet the header 22 at the air-side surface 118 of the header 22. As the heat exchanger 10 is removed from the furnace, the clad material on the exterior surface 54 of each tube 46 cools and forms joints in these areas. In some embodiments, the collection tank 26 is brazed directly to the header 22 to form heat exchanger tanks.

Figure 8:
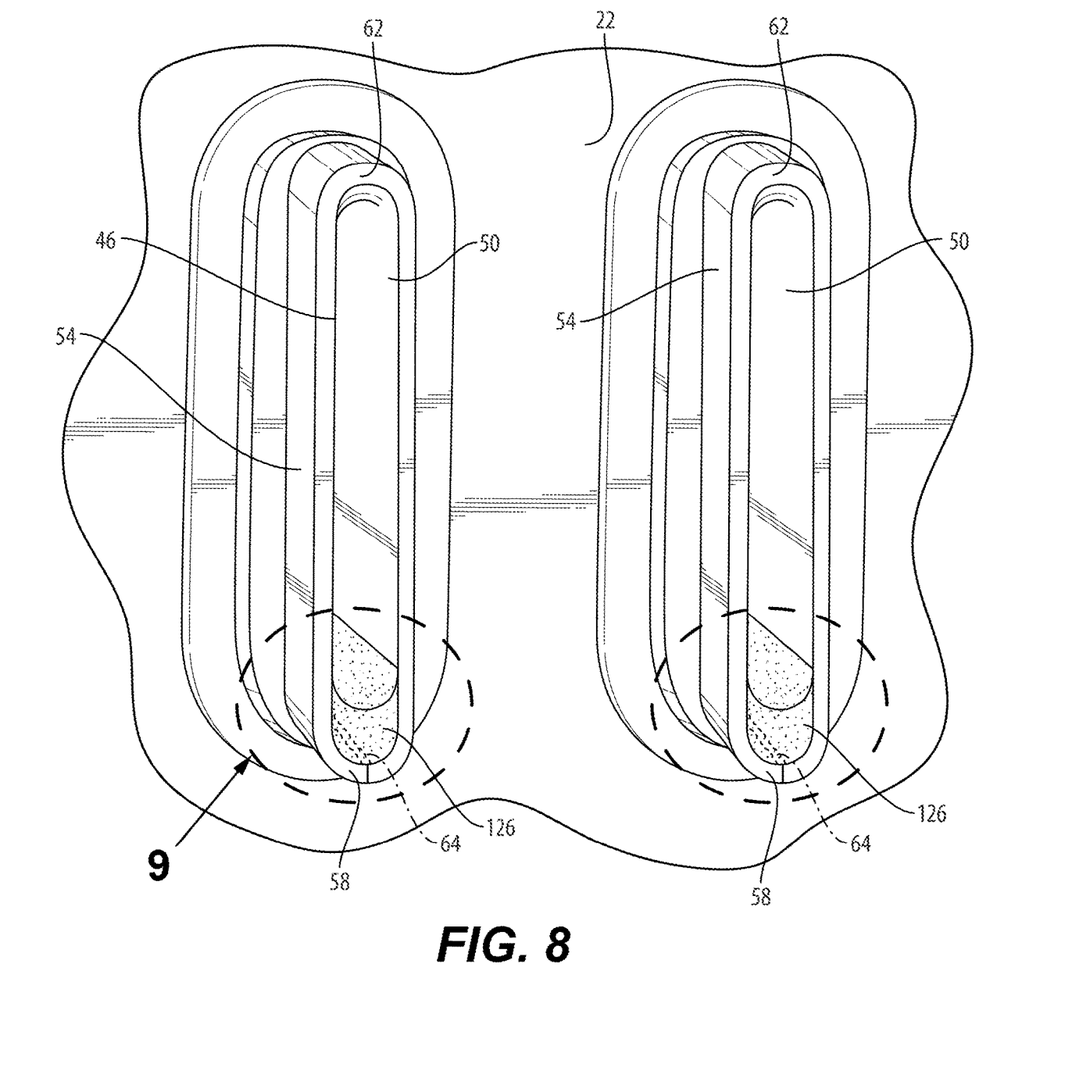
FIG. 8 is a perspective view of tubes for heat exchanger of FIG. 1 after brazing.
Figure 9:
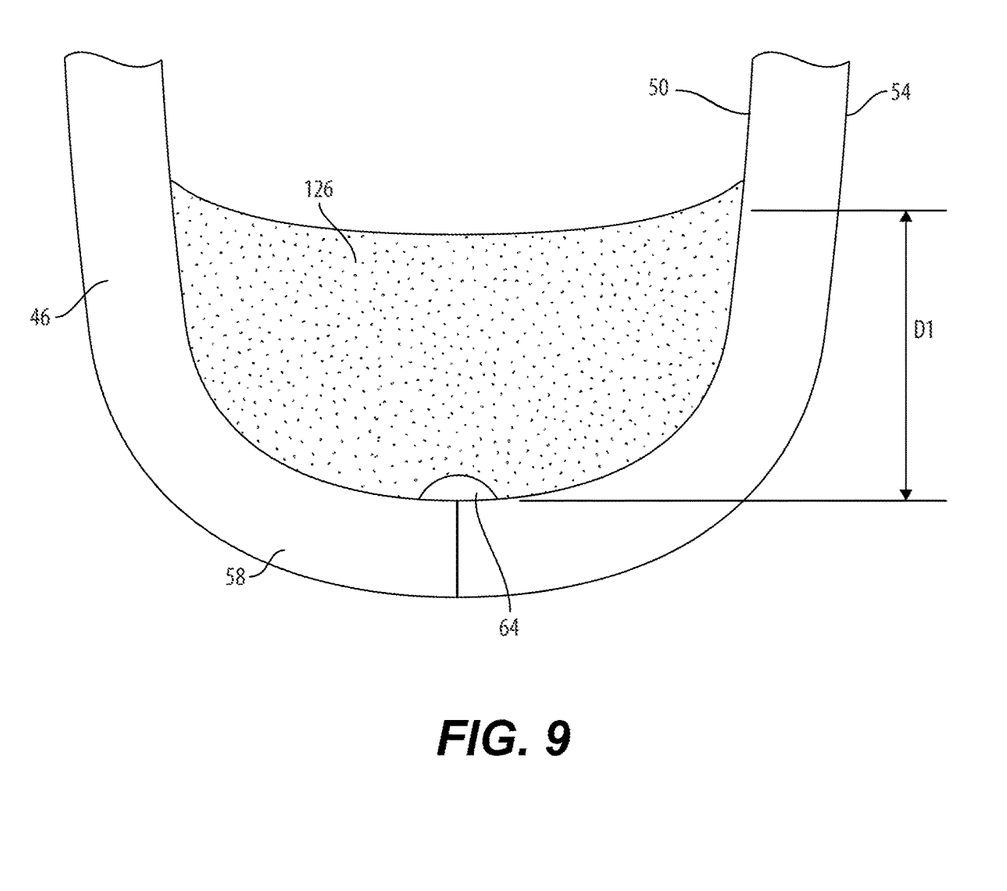
FIG. 9 is an enlarged view of a tube of the tubes of FIG. 8.

During the brazing process unwanted debris will be brazed within the inside cladding of the tube 46 during the brazing process to provide a cleaner tube interior volumes. With reference to FIGS. 8 and 9, the interior cladding on the interior surface 50 of each tube 46 also melts during the brazing process. The clad melts and travels along the direction of gravity to reach the first rounded edge 58 of the tube 46. The clad pools inside the plurality of tubes 46 at the first rounded edge 58 along an interior side of the weld seam 64 to form a clad cover portion 126, thereby covering debris generated while forming the weld seam 64 at the first rounded edge 58 of the tube 46. The clad cover portion 126 extends along a length of the tube 46 at the first rounded edge 58. The length of the tube 46 is defined along an extension direction of the tube 46. When the formation of tubes 46 is oriented such that the first rounded edges 58 of the tubes 46 are positioned closer to the ground surface A3 than the second rounded edges 62 of the tubes 46, the weld seams 64 extend perpendicular to the direction of gravity A4. This causes the clad cover portion 126 to form with an approximately even depth D1 along the length of the tubes 46.

FIG. 9 illustrates the clad cover portion 126 and the depth D1. The depth D1 is the shortest distance between the interior side of the weld seam 64 and a side 128 of the clad cover portion 126 opposite from the interior side of the weld seam 64. In some embodiments, the clad cover portion 126 has a depth D1 of at least 0.1 mm and at most 1 mm. In other embodiments, the clad cover portion 126 has a depth D1 of at least 0.25 mm and at most 0.5 mm. In further embodiments, the clad cover portion 126 has a depth D1 of at least 0.35 mm and at most 0.4 mm. The interior cladding on the interior surface 50 and the exterior cladding on the exterior surface 54 may be formed of an aluminum alloy such that the clad cover portion 126 is also formed of an aluminum alloy. The aluminum alloy forms the clad cover portion 126 and traps dust and debris at the weld seam 64 to inhibit coolant flowing through the plurality of tubes 46 from absorbing the dust and debris.

At step 130, the temporary cover 102 is removed from the header 22. At step 134 the collection tank 26 is coupled to the header 22 via, e.g., crimping. In some embodiments, the collection tank 26 is stainless steel and is snapped onto the header 22. When the collection tank 26 is coupled to the header 22, a gasket is arranged between the collection tank 26 and the header 22.

In an alternative embodiment, the collection tank 26 is coupled to the header 22 at step 98, instead of the temporary cover 102. In this alternative embodiment, the collection tank 26 remains on during step 110, thereby inhibiting contamination of the tubes 46. Also in this alternative embodiment, the collection tank 26 is removed prior to step 114, such that the collection tank 26 (which can be formed of plastic) does not melt during the brazing process. After the brazing process at step 114, the collection tank 26 would then be recoupled to the header 22. In further alternative embodiments, the method 70 only includes step 74, step 84 and step 114. In yet further alternative embodiments, the method 70 only includes step 74, step 84, step 114, and step 134.

In some embodiments, the heat exchanger 10 is part of a fuel cell and the liquid is fuel cell coolant. In some embodiments, instead of welding the portion 106 of the tubes 46 to the liquid-side surface 94 of the header 22, the slots 78 in the header 22 are packed with a sealant, which prevents the flux from entering the header 22 and contacting the liquid-side surface 94. The sealant then dissolves in the brazing process. In some embodiments, the collection tanks 26, 38 are aluminum with cladding on one or two sides, and the collection tanks 26, 38 are brazed to the headers 22, 34 during the brazing step 114 of the method 70.

In operation of the heat exchanger 10, a liquid (e.g. water and/or coolant) flows into the inlet 30 of the collection tank 26 at a relatively high temperature, and then flows through the tubes 46 to the collection tank 38, before flowing out the outlet 42. While flowing through the tubes 46, the liquid is cooled, as heat escapes the liquid via the tubes 46, which are typically cooled by airflow. In some embodiments, the heat exchanger 10 is used to coolant for fuel cell cooling. For many applications, the coolant is required to have very few impurities such as flux residues, dust, and debris. As such, the clad cover portion 126 covers the weld seam 64 at the first rounded edge 58 of the tubes 46, thereby covering and encasing dust and debris associated with the weld seam 64 and reducing impurities circulated by the coolant within the tubes 46.

By inserting every tube 46 for the heat exchanger 10 into corresponding header slots 78 with the weld seam 64 of each of the plurality tubes 78 oriented downward with respect to gravity, the method 70 advantageously improves ease of manufacturing. Without forming the clad cover portion 126, the dust and debris at the weld seam would not be encased. Coolant flowing through the tubes 46 would then pick up the dust and debris and circulate the dust and debris to other systems connected along a cooling circuit to the heat exchanger 10. This can harm the other systems connected along the cooling circuit. To remove the dust and debris from the tubes 46, manufacturers may use manufacturing methods including additional steps such as chemically washing the interior surfaces 50 of the tubes 46 with environmentally harmful chemicals. The disposal of the environmentally harmful chemicals can be particularly burdensome. The method 70 described in the present disclosure therefore reduces the number of steps to manufacture the heat exchanger 10, reduces negative environmental impacts from manufacturing the heat exchanger 10, and reduces use of environmentally harmful chemicals within the heat exchanger production facility.

Although the invention has been described in detail with reference to certain preferred embodiments, variations and modifications exist within the scope and spirit of one or more independent aspects of the invention as described.

What is claimed is:

1. A method of manufacturing a heat exchanger comprising:
   providing a plurality of tubes having exterior cladding on an exterior surface of each of the plurality of tubes, interior cladding on an interior surface of each of the plurality of tubes, and a weld seam extending along a length of each of the plurality of tubes;
   arranging the plurality of tubes into slots of a header such that each of the plurality of tubes is inserted into a corresponding header slot with the weld seam of each of the plurality of tubes oriented downward with respect to gravity;
   brazing the plurality of tubes and the header after the plurality of tubes has been inserted into the header slots, the brazing causing the interior cladding to melt and pool inside the plurality of tubes and along an interior side of the weld seams to form a clad cover portion within each of the plurality of tubes, the clad cover portion encasing debris generated while forming the weld seams.

2. The method of claim 1, wherein the weld seams of each of the plurality of tubes extend along the entire length of each of the plurality of tubes.

3. The method of claim 1, wherein a face of the header defines a plane, wherein the header slots are formed in the face of the header such that the plurality of tubes extend through the plane, and wherein the plane extends generally parallel to the direction of gravity.

4. The method of claim 1, wherein the exterior cladding and the interior cladding are formed of an aluminum alloy.

5. The method of claim 1, wherein the clad cover portion has a depth extending along the direction of gravity from the weld seam, across the clad cover portion, and to an interior volume of the tube, wherein the depth at least 0.35 mm.

6. The method of claim 5, wherein the depth of the clad cover portion is at most 0.4 mm.

7. The method of claim 1, wherein the plurality of tubes is formed of a material that has a lower melting point than the interior cladding.

8. The method of claim 1, wherein the clad cover portion is configured to inhibit coolant flowing through the plurality of tubes from absorbing dust and/or debris left over from the formation of the weld seam.

9. The method of claim 1, wherein arranging the plurality of tubes into slots of the header includes arranging every tube of the heat exchanger into slots of the header such that the weld seam of every tube of the heat exchanger is oriented downward with respect to gravity.

10. The method of claim 1, further comprising coupling the plurality of tubes to a corresponding header slot by sealing and brazing the plurality of tubes to the corresponding header slots.

11. The method of claim 10, wherein sealing the plurality of tubes to the corresponding header slots includes sealing a perimeter of each of the plurality of tubes to the corresponding header slots.

12. The method of claim 10, further comprising coupling a cover to the header to cover a liquid-side surface of the header and to cover ends of the tubes.

13. The method of claim 12, wherein coupling the cover to the header is performed after sealing the plurality of tubes to the corresponding header slots.

14. The method of claim 12, further comprising applying flux to an air-side surface of the header and to the plurality of tubes.

15. The method of claim 14, wherein sealing the plurality of tubes to the corresponding header slots includes sealing the plurality of tubes on the liquid-side surface of the header such that flux is inhibited from penetrating the header to contact the liquid-side surface.

16. The method of claim 14, wherein coupling the cover to the header is performed before applying flux to the air-side surface of the header and to the plurality of tubes.

17. The method of claim 14, wherein applying flux is performed before brazing the plurality of tubes to the corresponding header slots.

18. The method of claim 11, wherein coupling the plurality of tubes to the corresponding header slots includes sealing the plurality of tubes to the corresponding header slots such that every tube of the heat exchanger is sealed in a corresponding header slot with the weld seam of every tube of the heat exchanger oriented downward with respect to gravity.

19. The method of claim 1, wherein brazing the header and the plurality of tubes includes melting the exterior cladding on the exterior surface of the plurality of tubes to join the plurality of tubes to the header once the melted exterior cladding has cooled and hardened.

20. The method of claim 1, further comprising coupling the header to a collection tank after brazing the plurality of tubes and the header.

* * * * *